US011433371B2

(12) United States Patent
Lundin et al.

(10) Patent No.: US 11,433,371 B2
(45) Date of Patent: Sep. 6, 2022

(54) COMPOSITES FOR CHEMICAL SEQUESTRATION DECONTAMINATION

(71) Applicant: The Government of the United States of America, as represented by the Secretary of the Navy, Arlington, VA (US)

(72) Inventors: Jeffrey G. Lundin, Springfield, VA (US); Christopher L. McGann, Alexandria, VA (US); Spencer L. Giles, Lorton, VA (US); Grant Daniels, Lorton, VA (US); Robert B. Balow, Mount Ranier, MD (US); Jorge L. Miranda-Zayas, Ponce, PR (US); James H. Wynne, Alexandria, VA (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 643 days.

(21) Appl. No.: 16/361,940

(22) Filed: Mar. 22, 2019

(65) Prior Publication Data
US 2019/0291072 A1    Sep. 26, 2019

Related U.S. Application Data

(60) Provisional application No. 62/647,233, filed on Mar. 23, 2018.

(51) Int. Cl.
*B01J 20/26* (2006.01)
*B01J 20/06* (2006.01)
*B01J 20/28* (2006.01)
*B01J 20/30* (2006.01)
*A62D 3/38* (2007.01)
*A62D 101/26* (2007.01)
*A62D 101/02* (2007.01)

(52) U.S. Cl.
CPC ........... *B01J 20/06* (2013.01); *A62D 3/38* (2013.01); *B01J 20/261* (2013.01); *B01J 20/28026* (2013.01); *B01J 20/3064* (2013.01); *B01J 20/3085* (2013.01); *A62D 2101/02* (2013.01); *A62D 2101/26* (2013.01)

(58) Field of Classification Search
CPC .... B01J 20/06; B01J 20/261; B01J 20/28026; B01J 20/3064; B01J 20/3085; A62D 3/38; A62D 2101/02; A62D 2101/26
USPC ........................................................ 502/401
See application file for complete search history.

(56) References Cited

U.S. PATENT DOCUMENTS

2015/0364790 A1*  12/2015  Yonehara ............... H01M 4/925
                                                           429/314
2018/0175354 A1*   6/2018  Tokushima ............... H01B 1/10

OTHER PUBLICATIONS

Balow et al. "Environmental Effects on Zirconium Hydroxide Nanoparticles and Chemical Warfare Agent Decomposition: Implications of Atmospheric Water and Carbon Dioxide" ACS Appl. Mater. Interfaces 2017, 9, 39747-39757.
Balow et al., "Rapid Decontamination of Chemical Warfare Agent Simulant with Thermally Activated Porous Polymer Foams" Ind. Eng. Chem. Res. 2018, 57, 8630-8634.
Bandosz et al., "Reactions of VX, GD, and HD with Zr(OH)4: Near Instantaneous Decontamination of VX" J. Phys. Chem. C 2012, 116, 11606-11614.
Bermudez "Effect of Humidity on the Interaction of Dimethyl Methylphosphonate (DMMP) Vapor with SiO2 and Al2O3 Surfaces, Studied Using Infrared Attenuated Total Reflection Spectroscopy" Langmuir 2010, 26(23), 18144-18154.
Bromberg et al., "Degradation of Chemical Threats by Brominated Polymer Networks" Ind. Eng. Chem. Res. 2014, 53, 18761-18774.
Bromberg et al., "Nucleophilic Polymers and Gels in Hydrolytic Degradation of Chemical Warfare Agents" ACS Appl. Mater. Interfaces 2015, 7, 22001-22011.
Chen et al., "Chemical protection fabrics via surface oximation of electrospun polyacrylonitrile fiber mats" J. Mater. Chem., 2009, 19, 2432-2438.
Galhotra et al., "Carbon dioxide (C16O2 and C18O2) adsorption in zeolite Y materials: effect of cation, adsorbed water and particle size" Energy Environ Sci., 2009, 2, 401-409.
Garg et al., "Electrospinning jets and nanofibrous structures" Biomicrofluidics 5, 013403 (2011).
Giles et al., "Comparative roles of Zr4+ and Ni2+ Wells-Dawson hetero-metal substituted polyoxometalates on oxidation of chemical contaminants" Applied Catalysis A, General 542 (2017) 306-310.
Hu et al., "Water immersion aging of polydicyclopentadiene resin and glass fiber composites" Polymer Degradation and Stability 124 (2016) 35-42.
Kovacic et al., "On the mechanical properties of HIPE templated macroporous poly(dicyclopentadiene) prepared with low surfactant amounts" J. Mater. Chem. A, 2013, 1, 487.
Long et al., "Manganese Oxide Nanoarchitectures as Broad-Spectrum Sorbents for Toxic Gases" ACS Appl. Mater. Interfaces 2016, 8, 1184-1193.
Martin et al., "Mesoporous metal oxides formed by aggregation of nanocrystals. Behavior of aluminum oxide and mixtures with magnesium oxide in destructive adsorption of the chemical warfare surrogate 2-chloroethylethyl sulfide" Microporous and Mesoporous Materials 83 (2005) 47-50.
McGann et al., "Air Activated Self-Decontaminating Polydicyclopentadiene PolyHIPE Foams for Rapid Decontamination of Chemical Warfare Agents" Macromol. Rapid Commun. 2018, 39, 1800194.

(Continued)

*Primary Examiner* — Edward M Johnson
(74) *Attorney, Agent, or Firm* — US Naval Research Laboratory; Joseph T. Grunkemeyer

(57) ABSTRACT

Materials for decontamination of compounds having a phosphorous-sulfur bond or a phosphorous-oxygen bond. A porous polymer, such as poly(dicyclopentadiene), contains particles of zirconium hydroxide. The polymer optionally has hydroperoxide groups.

8 Claims, 14 Drawing Sheets

(56) References Cited

OTHER PUBLICATIONS

Mondloch et al., "Destruction of chemical warfare agents using metal-organic frameworks" Nat. Mat. 14, 512-516 (2015).
Peterson et al., "Evaluation of a robust, diimide-based, porous organic polymer (POP) as a high-capacity sorbent tor representative chemical threats" J Porous Mater (2012) 19:261-266.
Richaud et al.,"Thermooxidative aging of polydicyclopentadiene in glassy state" Polymer Degradation and Stability 102 (2014) 95-104.
Singh et al., "Multifunctional Silver-Exchanged Zeolite Micromotors for Catalytic Detoxification of Chemical and Biological Threats" Adv. Funct. Mater. 2015, 25, 2147-2155.
Singh et al., "Sulfur dioxide and nitrogen dioxide adsorption on zinc oxide and zirconium hydroxide nanoparticles and the effect on photoluminescence" Applied Surface Science 258 (2012) 5778-5785.
Wagner et al., "Reactions of VX, HD, and Their Simulants with NaY and AgY Zeolites. Desulfurization of VX on AgY" Langmuir 1999, 15, 8113-8118.
Wagner et al., "Rapid Nucleophilic/Oxidative Decontamination of Chemical Warfare Agents" Ind. Eng. Chem. Res. 2002, 41, 1925-1928.
Wang et al., "Mechanism and Kinetics for Reaction of the Chemical Warfare Agent Simulant, DMMP(g), with Zirconium(IV) MOFs: An Ultrahigh-Vacuum and DFT Study" J. Phys. Chem. C 2017, 121, 11261-11272.

\* cited by examiner

COMPOSITES FOR CHEMICAL SEQUESTRATION DECONTAMINATION

COMPOSITES FOR CHEMICAL SEQUESTRATION DECONTAMINATION

This application claims the benefit of U.S. Provisional Application No. 62/647,233, filed on Mar. 23, 2018. The provisional application and all other publications and patent documents referred to throughout this nonprovisional application are incorporated herein by reference.

TECHNICAL FIELD

The present disclosure is generally related to materials for decontamination.

DESCRIPTION OF RELATED ART

Eliminating the hazards associated with toxic industrial chemicals (TICs) and chemical warfare agents (CWAs) is necessary to ensure the safety of personnel designated for decontaminating affected areas and waste, as well as, protecting the warfighter and civilian population from such threats. Thus, the need for materials capable of automatically decontaminating toxic chemicals has spurred significant scientific effort into developing new reactive and sorbent materials and platforms (Bromberg et al., *Industrial & Engineering Chemistry Research*, 2014, 53, 18761-18774; Long et al., *ACS Applied Materials & Interfaces*, 2016, 8, 1184-1193; Martin et al., *Microporous and Mesoporous Materials*, 2005, 83, 47-50; Peterson et al., *Journal of Porous Materials*, 2012, 19, 261-266; Singh et al., *Advanced Functional Materials*, 2015, 25, 2147-2155; Wagner et al., *Langmuir*, 1999, 15, 8113-8118). An ideal decontamination material is highly scalable, comprises cheap compounds, and provides rapid decontamination performance. Currently, metal oxides and hydroxides (Bandosz et al., *Journal of Physical Chemistry C*, 2012, 116, 11606-11614), polyoxometallates (POMs) (Giles et al., *Applied Catalysis A: General*, 2017, 542, 306-310), and metal-organic frameworks (MOFs) (Mondloch et al., *Nat. Mater.*, 2015, 14, 512-6; Wang et al., *Journal of Physical Chemistry C*, 2017, 121, 11261-11272) are among some of the leading reactive materials being investigated for chemical warfare agent decontamination. Unfortunately, many of these promising compounds are cost prohibitive due to limited industrial scalability or may present problematic long-term stability due to reactions with atmospheric components and contaminants (Bermudez, *Langmuir*, 2010, 26, 18144-54; Galhotra et al., *Energy & Environmental Science*, 2009, 2, 401; Singh et al., *Applied Surface Science*, 2012, 258, 5778-5785).

Polymer materials offer a cheap, robust, and readily tunable platform that can be exploited for toxic chemical decomposition. Polymers with hydrolytic and nucleophilic functionality, such as poly(vinyl alcohol-co-vinylamine), poly(ethylenimine), and polyacrylamidoxime, have been shown to be effective at decomposing or detoxifying many toxic chemicals and different classes of chemical warfare agents such as blister agents (sulfur mustard) and nerve agents (sarin, soman, VX, etc.) (Bromberg et al., *ACS Applied Materials & Interfaces*, 2015, 7, 22001-11). Furthermore, integration of such polymers has been suggested to be easily integrated into fibrous materials for self-decontaminating fabrics and wipes.

Peroxide containing decontamination solutions are effective for detoxifying TICs and CWAs, but are highly corrosive to skin and detrimental to many materials and electronics. Recently, poly(dicyclopentadiene) (polyD) has been shown to auto-oxidize in air to produce peroxo and carbonyl moieties. These auto-generated peroxo species are very strong oxidants, capable of similar detoxification as peroxide-based decontamination solutions, but with the advantage of confining peroxides to the polymer matrix and thus greatly reducing potential unintended corrosion problems if used for chemical decontamination. Additionally, polyD was shown to be environmentally robust when integrated as into resins and glass composites, demonstrating minimal degradation in both deionized and salt water (Hu et al., *Polymer Degradation and Stability*, 2016, 124, 35-42). Furthermore, polyD forms relatively stable native peroxide species in air compared to current peroxide-based decontamination solutions, which have limited shelf life due to shorter-lived aqueous peroxide species comprising the decontamination solution (Wagner et al., *Industrial & Engineering Chemistry Research*, 2002, 41, 1925-1928).

Recently, a low cost and commercially scalable metal hydroxide powder, zirconium hydroxide ($ZrOH_4$), has shown instantaneous decontamination of VX (Bandosz et al., *Journal of Physical Chemistry C*, 2012, 116, 11606-11614) and broad spectrum decontamination performance against several other classes of CWAs and TICs. $Zr(OH)_4$ is also highly sorbent and readily sequesters CWAs and TICs from both liquid and gas phase, making it especially useful for filtration applications. $Zr(OH)_4$ is stable in air and remains active even when exposed to common atmospheric components such as $CO_2$ and humidity (Balow et al., *ACS Appl. Mater. Interfaces* 2017, 9, 39747-39757).

BRIEF SUMMARY

Disclosed herein is a composition comprising: particles comprising zirconium hydroxide and a polymer produced by ring-opening metathesis polymerization.

Also disclosed herein is a method comprising: providing an emulsion comprising: a cyclic aliphatic monomer comprising a double bond; particles comprising zirconium hydroxide; and water; and polymerizing the monomer by ring-opening metathesis polymerization to form a porous polymer embedded with the zirconium hydroxide particles.

BRIEF DESCRIPTION OF THE DRAWINGS

A more complete appreciation will be readily obtained by reference to the following Description of the Example Embodiments and the accompanying drawings.

DETAILED DESCRIPTION OF EXAMPLE EMBODIMENTS

In the following description, for purposes of explanation and not limitation, specific details are set forth in order to provide a thorough understanding of the present disclosure. However, it will be apparent to one skilled in the art that the present subject matter may be practiced in other embodiments that depart from these specific details. In other instances, detailed descriptions of well-known methods and devices are omitted so as to not obscure the present disclosure with unnecessary detail.

Figure 1:
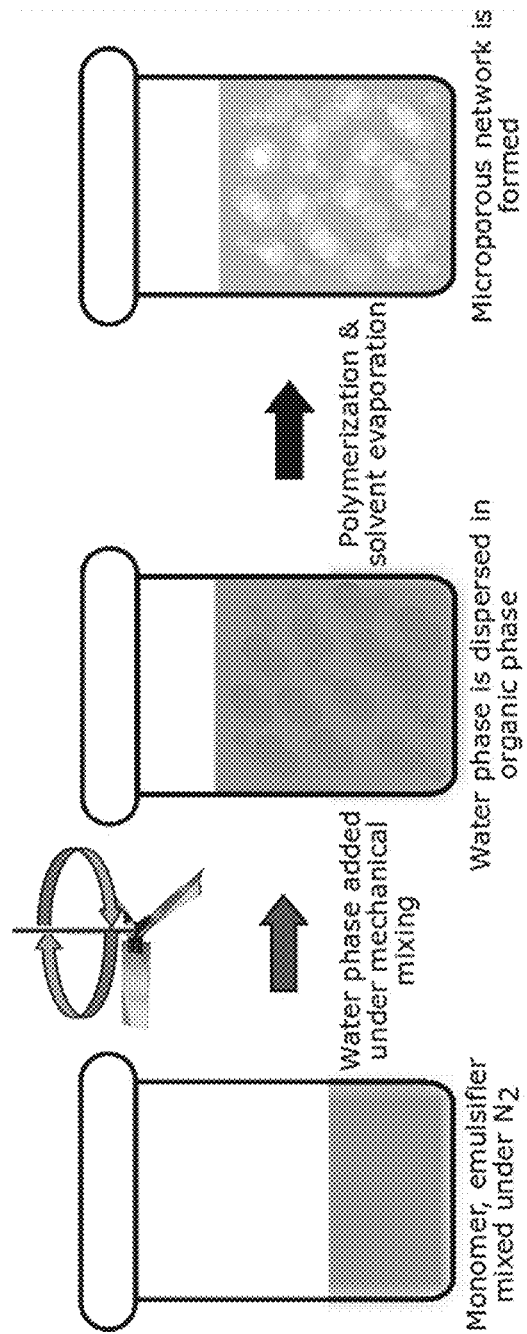
FIG. 1 shows a diagram of high internal phase emulsion templating.
Figure 2:
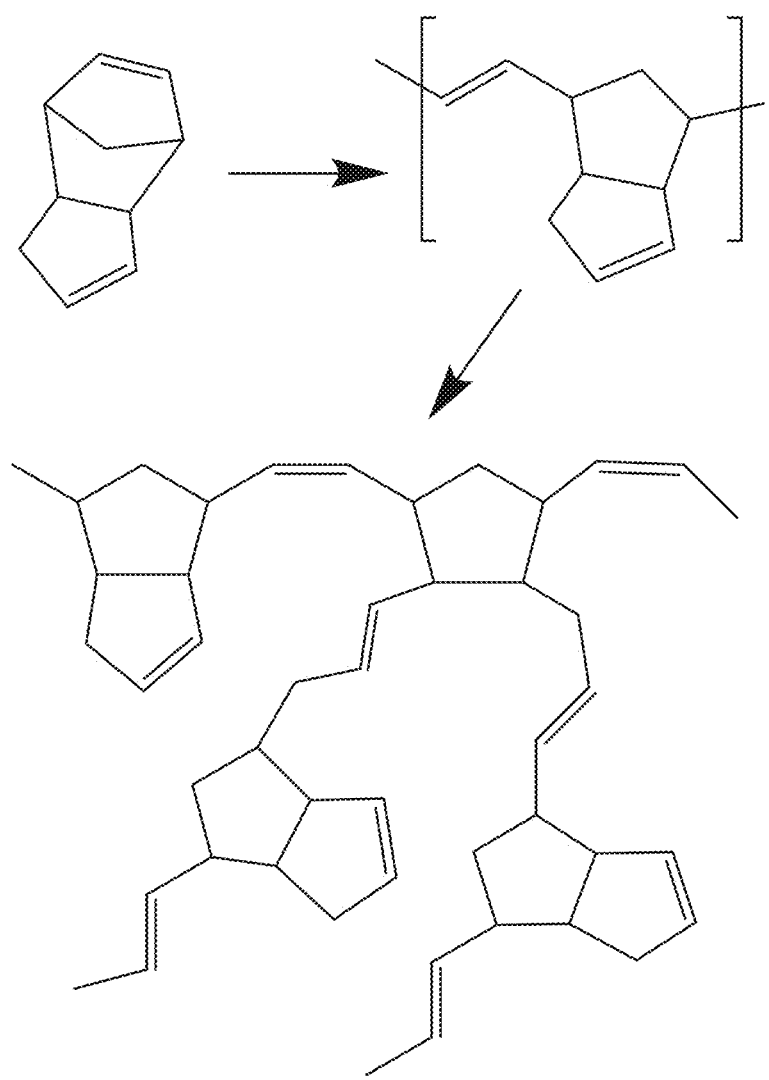
FIG. 2 shows a scheme of ring-opening metathesis polymerization (ROMP) synthesis of dicyclopentadiene reaction and cross-linking.
Figure 3:
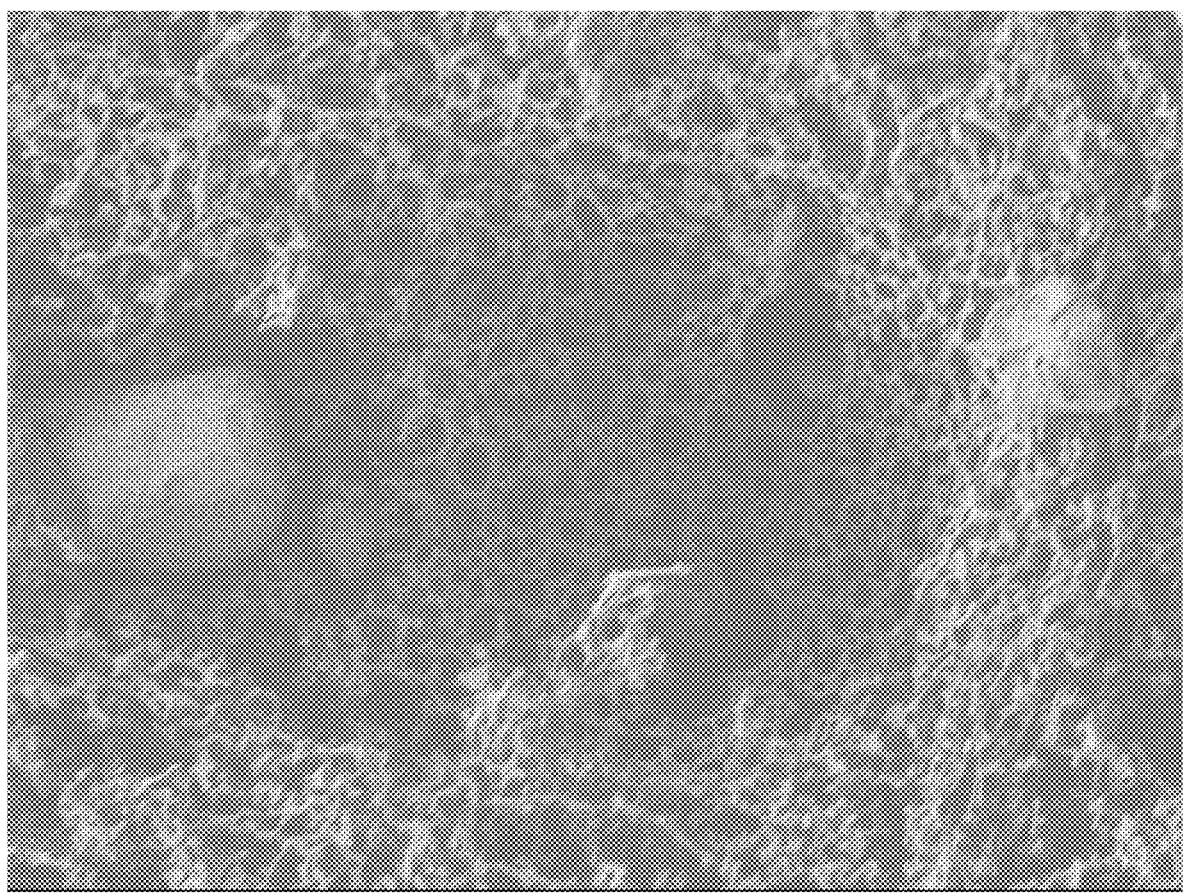
FIG. 3 shows an SEM analysis of zirconium hydroxide-loaded polydicyclopentadiene (DCPD) foams.
Figure 4:
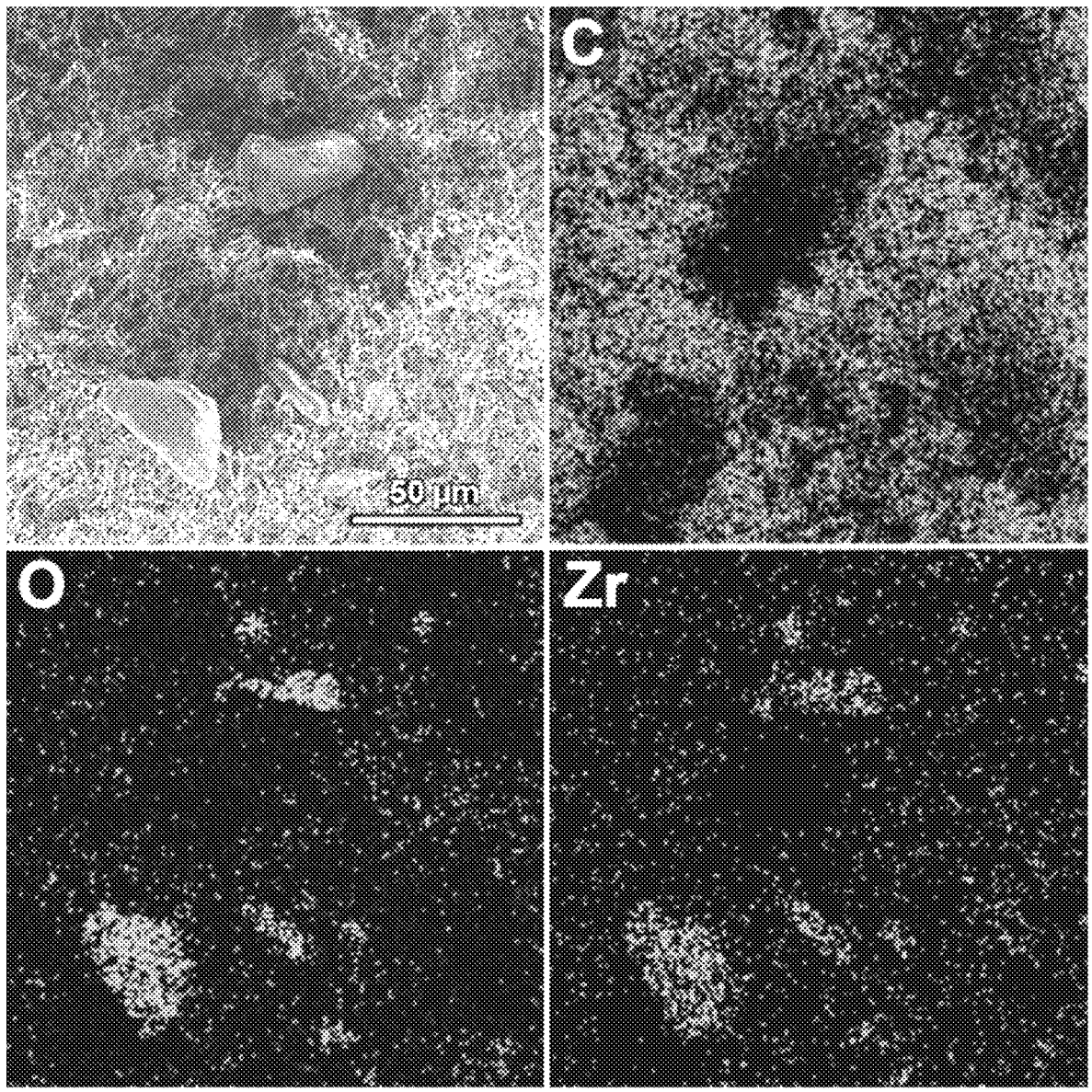
FIG. 4 shows an SEM/EDS analysis of zirconium hydroxide-loaded DCPD foams.
Figure 5:
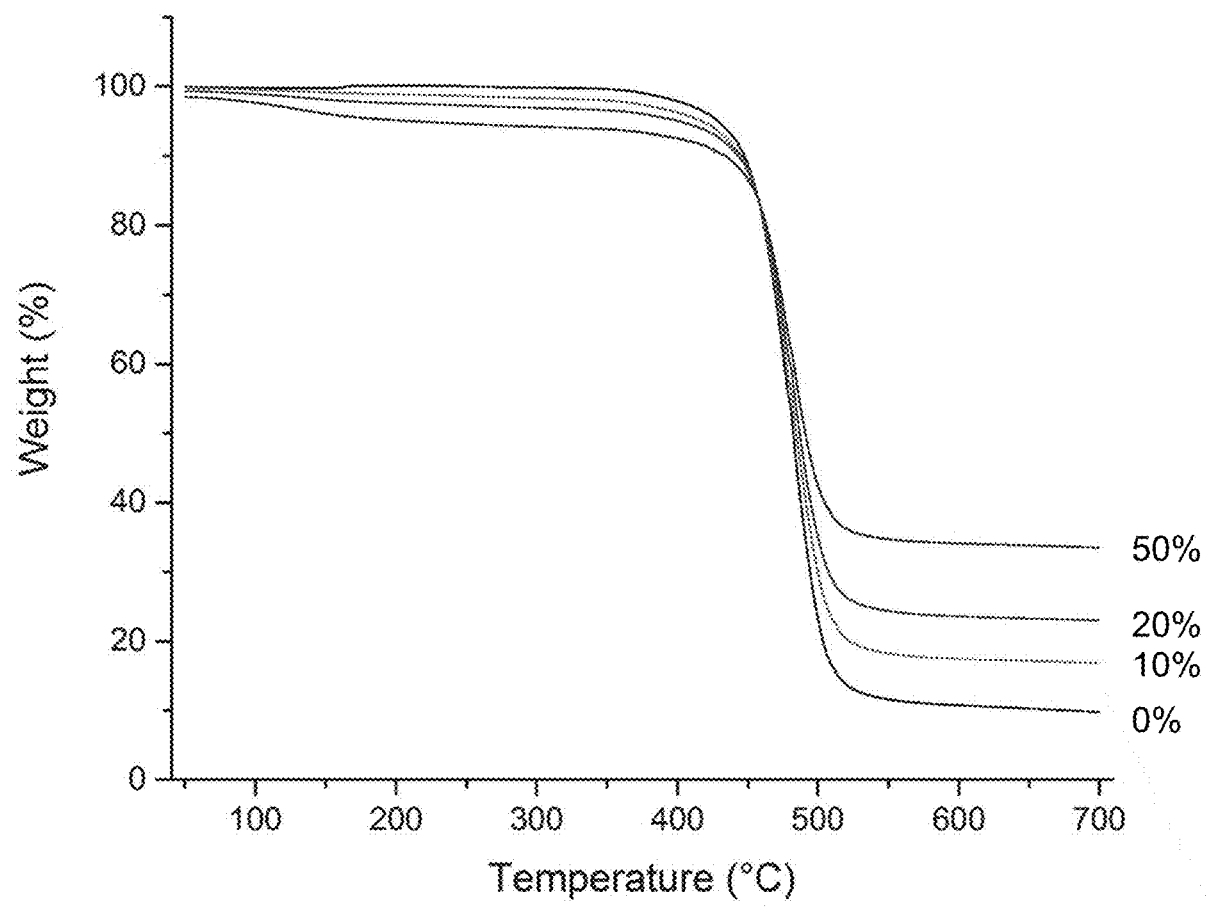
FIG. 5 shows TGA of analysis of zirconium hydroxide-loaded DCPD foams.
Figure 6:
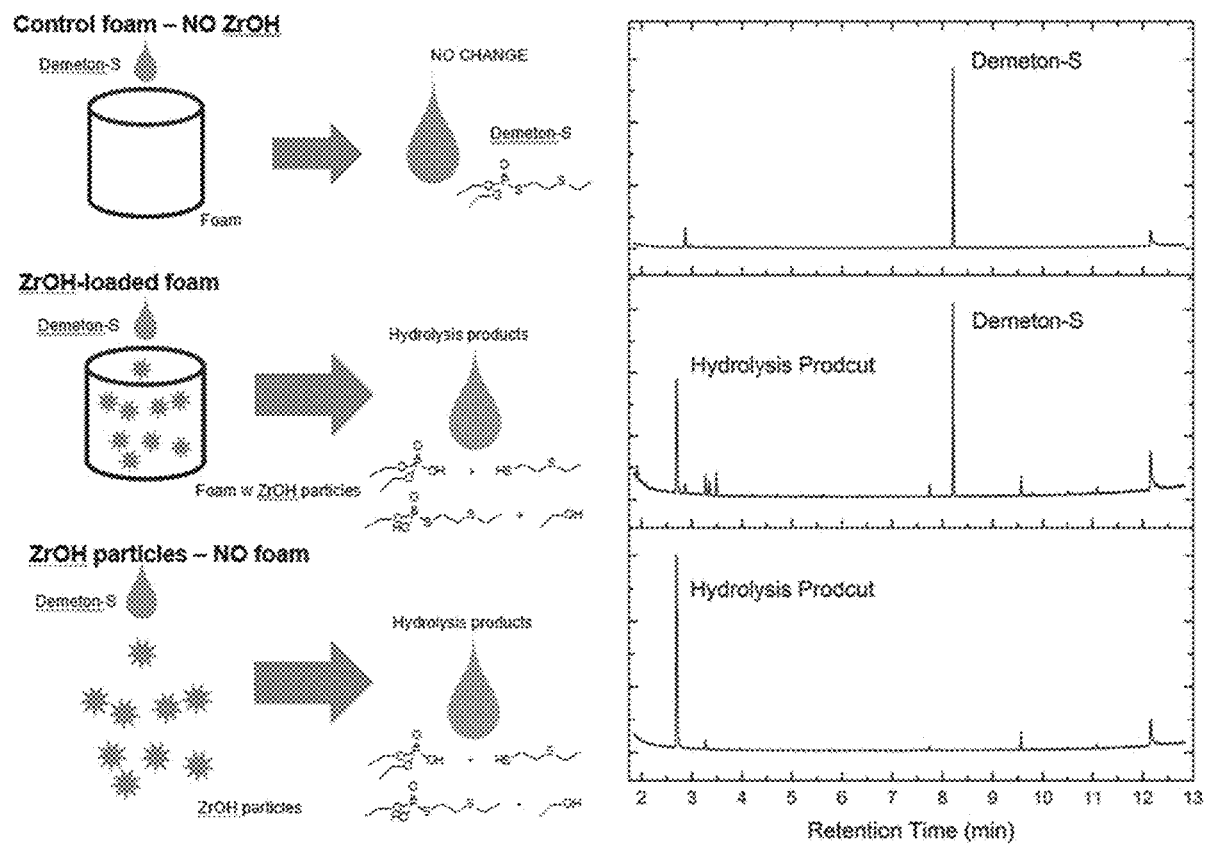
FIG. 6 shows a scheme and GC-MS chromatogram illustrating a typical Demetons-S/zirconium hydroxide foam challenge.

Disclosed herein is a polymer composite comprising zirconium hydroxide and a class of cyclic olefin polymers that may form stable hydroperoxides. Both the zirconium hydroxide and the hydroperoxide-containing cyclic olefin polymer exhibit decontamination properties with both components demonstrating the ability to react with and/or sequester chemical warfare agent simulants. The polymer is produced through a ring-opening polymerization reaction into a variety of different form factors: thin films, porous foams, or microparticles. The polymer, upon exposure to oxygen, will form stable hydroperoxides that persist for weeks, due to favorable reaction kinetics. The initiation of hydroperoxide formation has a relatively high rate constant whereas the termination reaction constant is relatively low, especially when compared to linear olefin polymers (e.g. polybutadiene, polyisoprene); the imbalance allows for the accumulation of stable hydroperoxide moieties on the polymer that in turn may react with external chemistries that come in contact with the polymer material. Concomitant with the hydroperoxide reactions, the zirconium hydroxide also acts as a detoxifying medium for chemical warfare agents through acidic hydrolysis. Therefore, taken together, the polymer composite, charged with hydroperoxide and loaded with zirconium hydroxide, provides two separate mechanisms for the detoxification of chemical warfare agents.

$Zr(OH)_4$ particles can be easily incorporated into the polyD matrix by both bottom up (during synthesis) and top-down (post synthesis application) methods. The highly porous structure assists in tethering $Zr(OH)_4$ particles to the polymer surface, which greatly reduces leaching or mechanical losses of $Zr(OH)_4$ from the integrated polymer network. Additionally, the morphology of the polymer matrix can exploit capillary action to wick and drive liquid CWA and TICs to the $Zr(OH)_4$ for decontamination, thereby providing a composite material capable of both sequestration and decontamination.

The material comprises a cross-linked cyclic olefin polymer network containing zirconium hydroxide particles. The initial form factor is a polymer-particle composite foam constructed using a technique called high internal phase emulsion (HIPE) templating. In HIPE templating, monomer and surfactant is vigorously mixed with a non-miscible phase to form an emulsion. The monomer-containing "external" phase is polymerized while the dispersed "internal" phase acts as a porogen, creating a hierarchical porous structure that persists after solvents are removed (FIG. 1).

The composition may be made from any polymer that is produced by ring-opening metathesis polymerization, and optionally, the polymerization may be by high internal phase emulsion templating to produce pores. One suitable polymer is polydicyclopentadiene. Other polymers not made by ring-opening metathesis polymerization may also be used if they contain hydroperoxide groups, such as polystyrenes, polyesters, and polyurethanes. More than one monomer may also be used to make copolymers or mixtures of polymers. All polymers used herein will also comprise particles of zirconium hydroxide.

The materials may break down gaseous compounds that contain a phosphorous-sulfur bond or a phosphorous-oxygen bond. Such compounds include, but are not limited to O,O-diethyl S-2-(ethylsulfanyl)ethyl phosphorothioate, 2-chloroethyl ethyl sulfide, and ethyl ({2-[bis(propan-2-yl) amino]ethyl}sulfanyl)(methyl)phosphinate.

For the composite foams, a typical monomer utilized is dicyclopentadiene, which is polymerized through a ring-opening metathesis polymerization (ROMP) reaction (FIG. 2, Balow et al., *Ind. Eng. Chem. Res.* 2018, 57, 8630-8634; McGann et al., *Macromol. Rapid Commun.* 2018, 39, 1800194) using a ruthenium-based catalyst: [1,3-bis(2,4,6-trimethylphenyl)-2-imidazolidinylidene] dichloro(3-phenyl-1H-inden-1-ylidene)(tricyclohexylphosphine)ruthenium(II) or more commonly referred to as M2.

A typical synthesis of the polymer foam composite consists of mixing 6.5 g of dicyclopentadiene with 0.645 g of the surfactant, Pluronic L121, under nitrogen in a three-neck flask using a stand mixer and PTFE paddle. Over the course of thirty minutes, DI water, either with or without the zirconium hydroxide particles, is dripped into the reaction vessel, generally up to an 89% v/v. The solution turns from clear to milky white and begins to thicken as an emulsion forms. The aqueous phase is added to a predefined composition of water/monomer/surfactant/zirconium hydroxide before approximately 6 mg of M2 catalyst is mixed with 500 μL of toluene and mixed into the emulsion. The emulsion is moved into molds and cross-linked at 85° C. in an oven or oil bath.

After cross-linking for 4 to 12 hours, depending on the specific method, the foams are removed the mold and placed in a Soxhlet vessel where they are extracted with acetone at 85° C. for a period of 24-48 hours. The extracted foams are subsequently dried overnight in a vacuum oven and stored under vacuum and/or nitrogen.

Confirmation of the composite foams porosity and loading of zirconium was conducted via SEM. As illustrated in FIG. 3, the zirconium hydroxide particles are physically entrapped within a porous polymer network; large crystals are contained within a mesh-like structure with spherical voids and pores.

Further confirmation of the composite is apparent when energy-dispersive X-ray spectroscopy is utilized as shown in FIG. 4. The zirconium and oxygen channels align with the large crystals present in the polymeric material, which is largely carbon-based.

Composite foams with varying levels of zirconium hydroxide could be achieved (from 0 to 50%) and confirmed using TGA (FIG. 5). Foams were exposed to a temperature ramp of up to 700° C. under nitrogen. As the carbon and oxygen components of the material were burned away, the residual weight percent reflected the initial loading of zirconium hydroxide.

In order to assess the reactivity of the embedded zirconium hydroxide to chemical warfare agents and TICs, a Demeton-S challenge was utilized and analyzed using GC-MS. Stock solutions of Demeton-S were prepared in acetonitrile at a 2.92 mM concentration. To the surface of 40 mg pieces of composite foam, 100 μL of the Demetons-S stock solution was added and quickly wicked into the material. Following exposure for 24 hours, the samples were extracted with 900 μL of acetonitrile and analyzed on GC-MS. FIG. 6 illustrates the results of a typical analysis.

The scheme in FIG. 6 illustrates the results of a challenge to a control foam without the zirconium hydroxide (top panel) and a control sample of zirconium hydroxide particles (bottom panel). The middle panel illustrates a typical result from a zirconium-loaded foam. Demeton-S is retrieved intact from control foams containing no zirconium hydroxide. Typically, retention time for the Demeton-S is approximately eight minutes. However, when Demeton-S is exposed to zirconium hydroxide whether it be within the foams or as plain particles, the appearance of hydrolysis products become apparent at between two and four minutes. The chemical structure of Demeton-S and its typical hydrolysis products are illustrated alongside the scheme. From these results, it is clear that zirconium hydroxide remains active within the polymer foams and contributes to the hydrolysis of Demeton-S.

Figure 7:
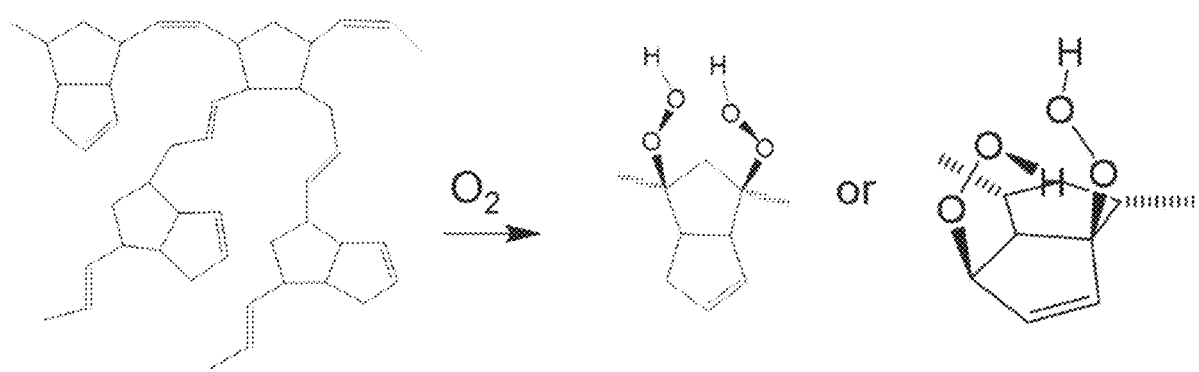
FIG. 7 shows a chemical scheme illustrating the formation of hydroperoxide groups on the polydicyclopentadiene.

However, this analysis illustrates only one of the pathways this material provides for the decontamination of chemical warfare agents and TICs. Upon exposure to oxygen, the polymer structure undergoes a transformation as stable hydroperoxide moieties are able to accumulate on the polymer. FIG. 7 illustrates the chemical changes the foams undergo during this oxidation or "aging" process.

Figure 8:
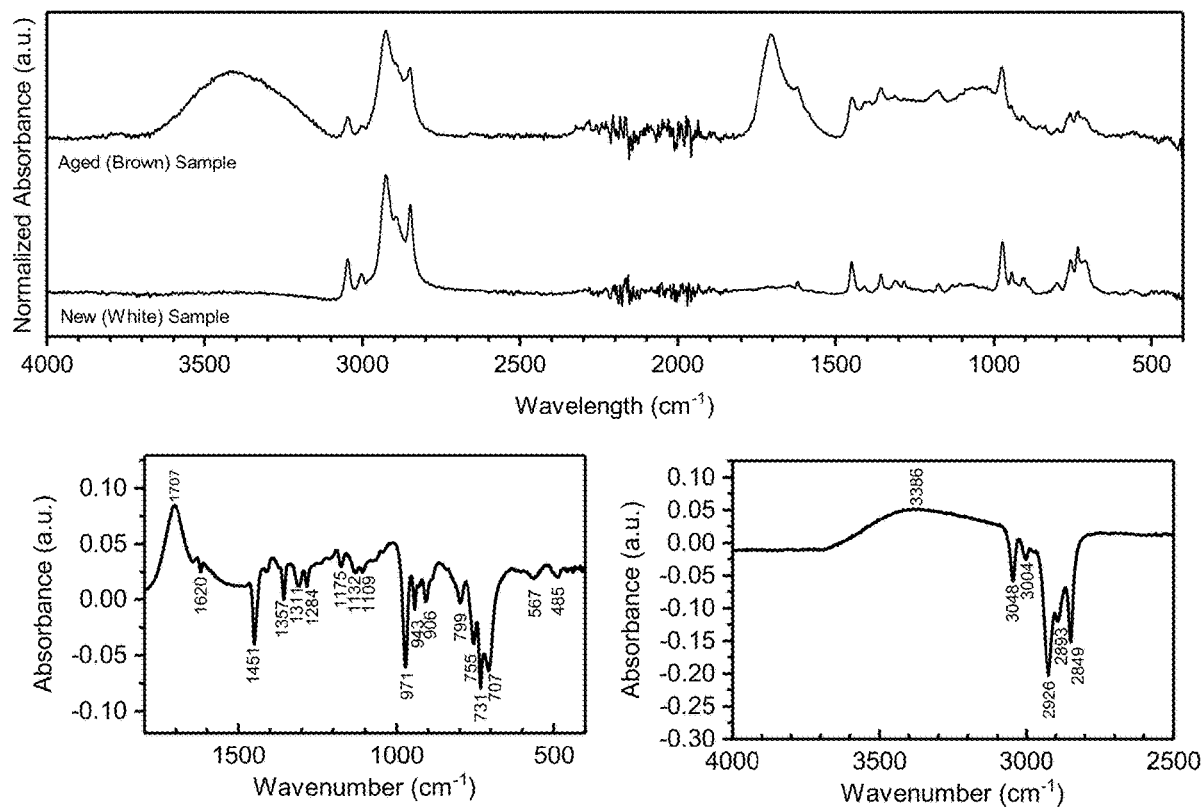
FIG. 8 shows FTIR-ATR analysis of unaged and aged polyD foams.

The "aging" of the polyD foam can further be analyzed using FTIR-ATR. FIG. 8 presents two IR spectra where a sample of unaged foam is compared directly to a sample of foam that had been exposed to air for approximately two weeks. The top panel of FIG. 8 illustrates the appearance of a broad peak in the 3300 cm$^{-1}$ suggesting the formation of hydroxide groups and a peak at 1707 suggesting formation of carbonyl groups. The bottom panels present the difference between the absorbance spectra of the two samples in close-ups of the 2500-4000 cm$^{-1}$ and the 400-1800 cm$_{-1}$ region. Positive absorbance represents the species that are being formed while the negative absorbance indicates the species that are being lost. The loss of alkene groups in the region of 2800-300 nm and the formation of hydroxyl and carbonyl groups in the region of 3000 nm and 1700 nm respectively help to confirm the oxidation of the polyD foams.

Figure 9:
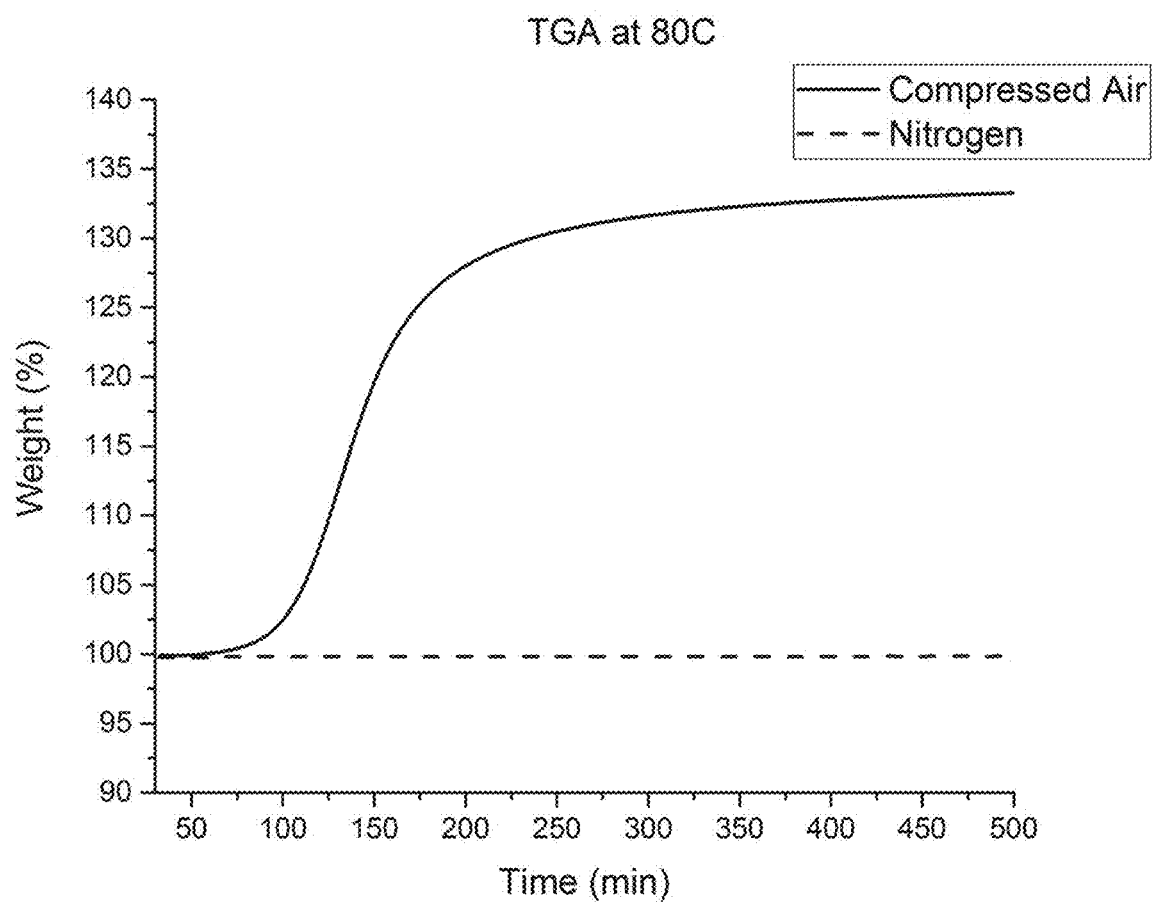
FIG. 9 shows a TGA experiment illustrating the mass gain of polyD foams when exposed to compressed air.
Figure 10:
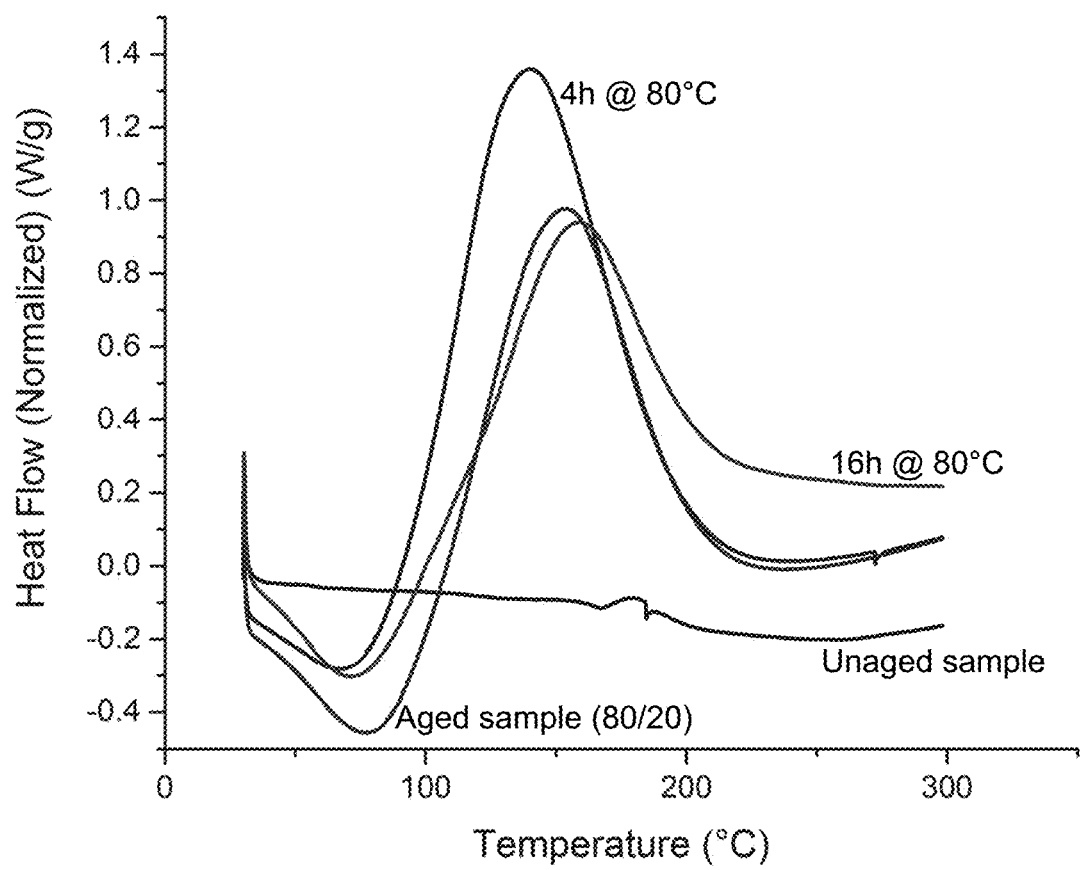
FIG. 10 shows a DSC experiment illustrating the presence of hydroperoxide groups on "aged" polyD foams.

The oxidation and stable addition of oxygen species to the polyD foams can be monitored using TGA and DSC. FIG. 9 illustrates an experiment where the mass of a sample of DCPD foam was held at a constant temperature of 85° C. in the furnace of a TGA while exposed to compressed air (solid line) or pure nitrogen (dashed line) flowing at a rate of 50 mL/min. The solid line demonstrates that within 300 minutes the polyD foam quickly gains 30% in mass due to the presence of oxygen whereas the dashed line remains stable indicating no increase in mass. FIG. 10 illustrates a series of DSC experiments on samples of polyD foam that have been exposed to air at 80° C. for 4 hour, 16 hours, aged for several weeks at room temperature and a control sample which was stored under vacuum. A typical experiment would be to ramp 10° C./min from 50° C. to 300° C. and monitor the heat flow. Previously, it has been established that endothermic peak centered at 140° C. corresponds to the decomposition of hydroperoxide groups on polyD films (Bromberg et al., Industrial & Engineering Chemistry Research, 2014, 53, 18761-18774; Long et al., ACS Applied Materials & Interfaces, 2016, 8, 1184-1193). The "aged" polyD foams demonstrate similar behavior.

Figure 11A:
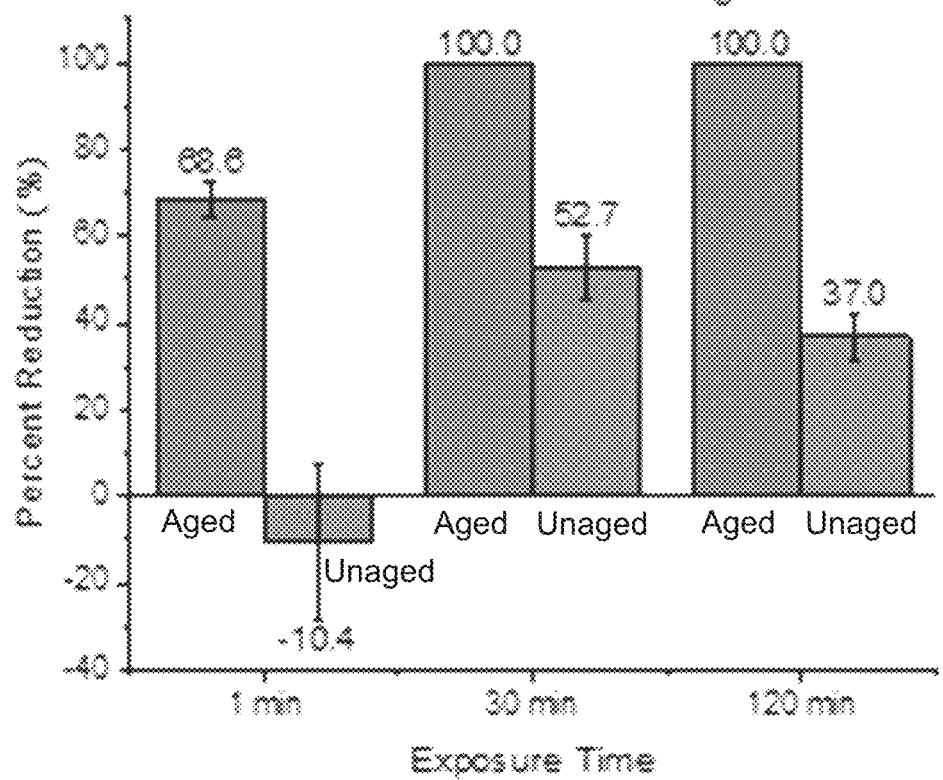
FIGS. 11A-11F show results and analysis of a challenge assay performed using Demeton-S and CEES on the "aged" and "unaged" samples of polyD foam. The top two graphs represent percent reduction while the chromatograms illustrate the appearance of sulfoxide byproducts for both Demeton-S and CEES.
Figure 11B:
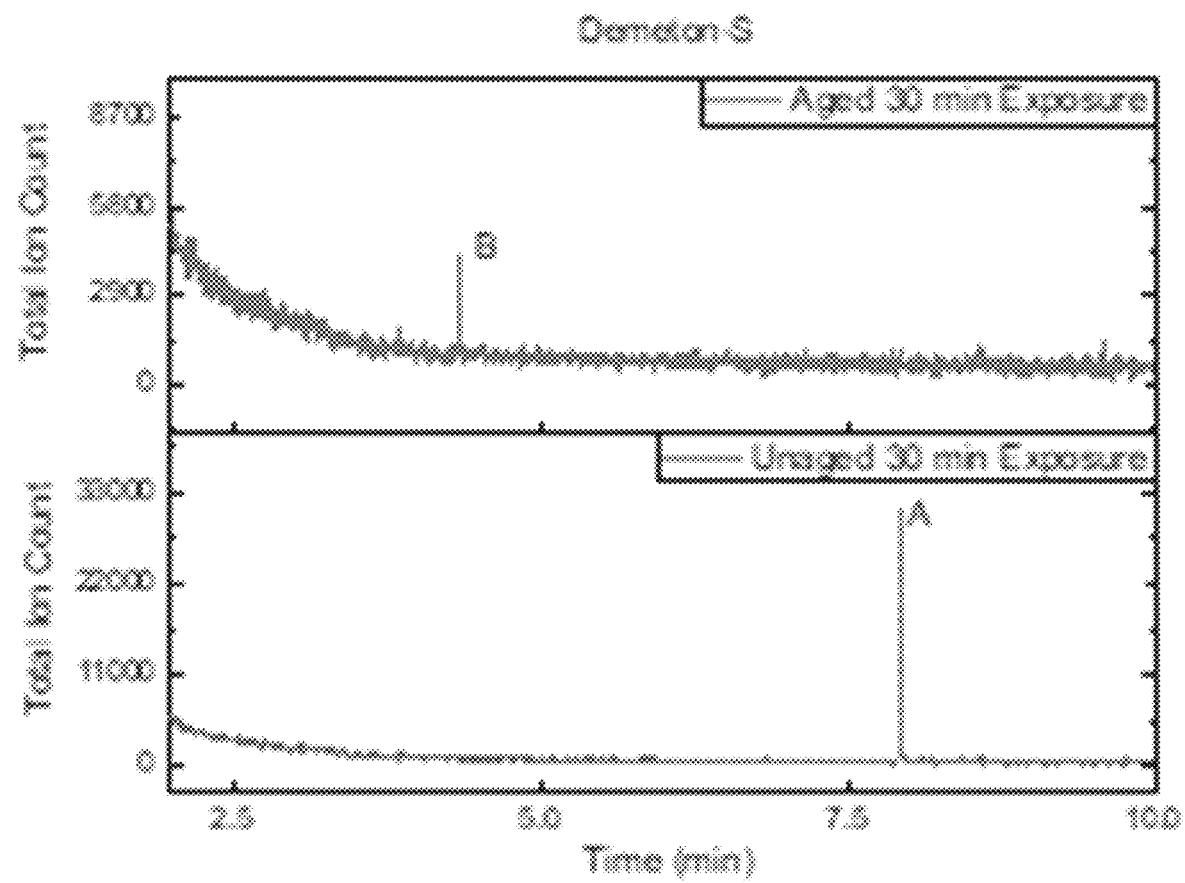
Figure 11C:
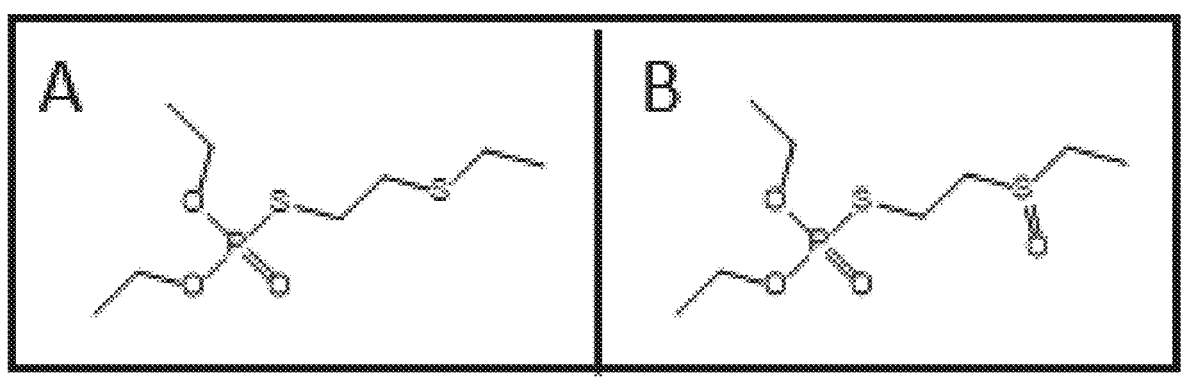
Figure 11D:
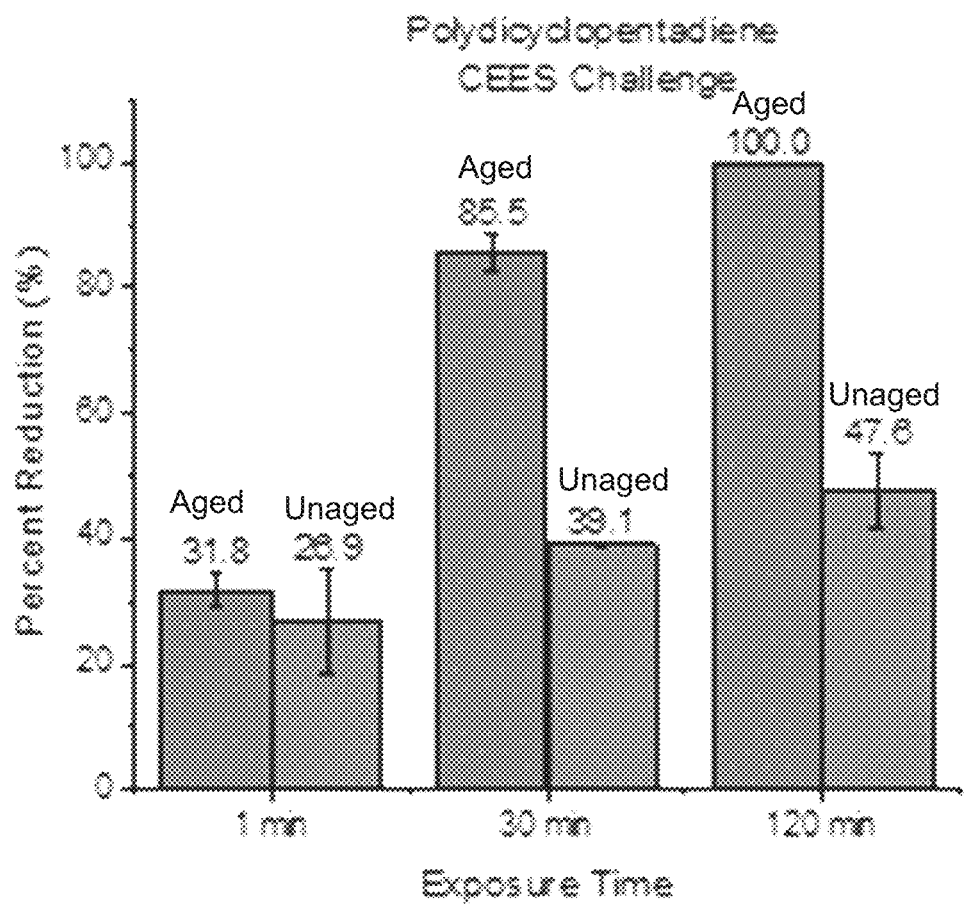
Figure 11E:
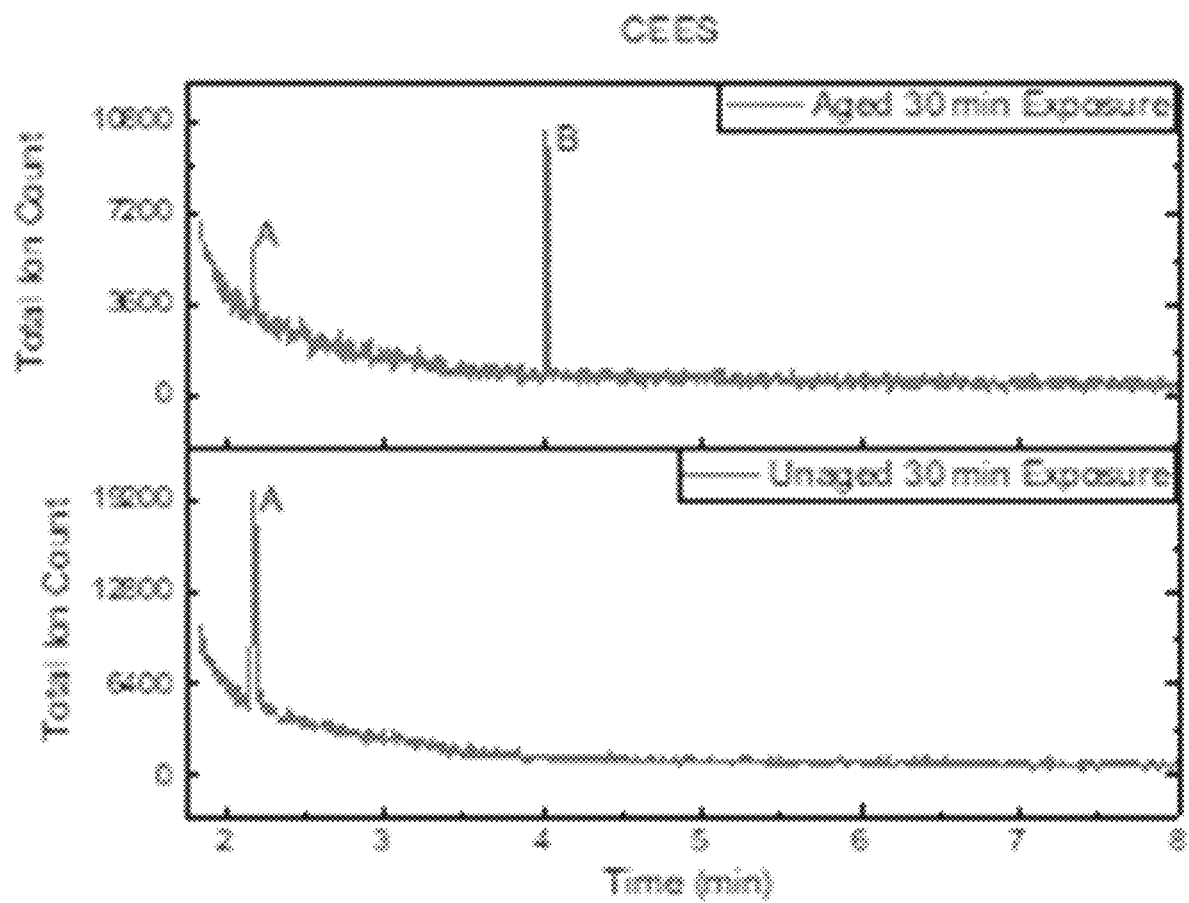
Figure 11F:
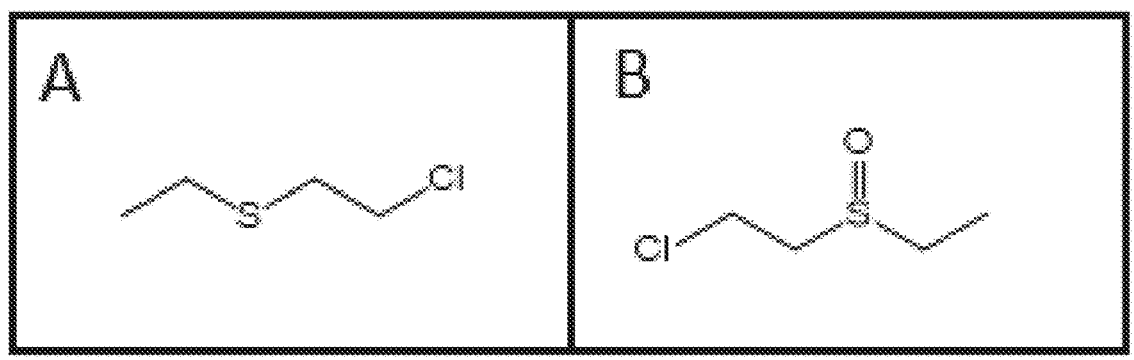

The hydroperoxide groups on the polyD foams are stable but reactive species and have been shown to oxidize two chemical warfare agent simulants: Demeton-S and 2-chloroethyl ethyl sulfide (CEES). A simulant challenge analyzed via GC-MS was performed to confirm the reactivity of the hydroperoxide groups. A typical experiment was as follows: 25 μL of a stock solution of either simulant at a 3 mM concentration in acetonitrile was applied to the surface of a 5-7 mg disc of polyD foam that had been exposed to air for a week at room temperature, including unaged controls kept under vacuum. The exposure times were varied between 1 min, 30 min, and two hours. Following that period of exposure the disc was immersed in 1 mL of acetonitrile, vortexed, and analyzed via GC-MS. FIGS. 11A-11F illustrate the typical results for both Demeton-S and CEES; the left bars illustrate the percent reduction for aged samples and the right bars represent the present reduction for unaged samples (FIGS. 11A and 11D). In most cases, the percent reduction for both Demeton-S and CEES was positive; however, the aged samples illustrated a faster reduction and more complete reduction of the simulant over the experimental period examined. Demeton-S was completely reacted at 30 minutes and CEES demonstrated an 85.5% reduction in the same period. When compared to unaged samples, it becomes clear that the reason for reduction in signal is mostly due to the presence of hydroperoxides in the aged samples. Furthermore, analysis of the GC-MS chromatograms (FIGS. 11B and 11E) illustrates the formation of the expected sulfoxide byproducts (FIGS. 11C and 11F) for both Demeton-S and CEES. The signal labeled B has a mass, which corresponds, to the chemical structure labeled B for both the chemical warfare agent simulants.

Potential advantages to this unique approach are the dual, but complementary, mechanism by which the foams may decontaminate lethal chemical warfare agents or TICs. The inclusion of inexpensive zirconium hydroxide particles within polymer foams presents a useful form factor, which could see application in self-decontaminating sponges, or filters that would protect armed forces personnel or the civilian populace from lethal attacks from chemical weapons or toxins released from industrial activities. To this point, most materials that handle decontamination efforts (e.g. activated carbon) do not perform any activity apart from sequestration of the deadly agent. These foams not only serve to sequester, but provides two reaction mechanisms that reduce toxicity of the offending chemical.

Obviously, many modifications and variations are possible in light of the above teachings. It is therefore to be understood that the claimed subject matter may be practiced otherwise than as specifically described. Any reference to claim elements in the singular, e.g., using the articles "a", "an", "the", or "said" is not construed as limiting the element to the singular.

What is claimed is:

1. A composition comprising:
    particles comprising zirconium hydroxide; and
    a poly(dicyclopentadiene) produced by ring-opening metathesis polymerization.

2. The composition of claim 1, wherein the poly(dicyclopentadiene) comprises hydroperoxide groups.

3. The composition of claim 1, wherein the poly(dicyclopentadiene) comprises pores.

4. The composition of claim 3, wherein the pores are produced by high internal phase emulsion templating.

5. A method comprising:
providing the composition of claim 1; and
exposing the composition to a gas suspected of comprising a compound having a phosphorous-sulfur bond or a phosphorous-oxygen bond.

6. The method of claim 5, wherein the compound is O,O-diethyl S-2-(ethylsulfanyl)ethyl phosphorothioate, 2-chloroethyl ethyl sulfide, or ethyl ({2-[bi s(propan-2-yl) amino] ethyl sulfanyl)(methyl)phosphinate.

7. A method comprising:
providing an emulsion comprising:
a dicyclopentadiene;
particles comprising zirconium hydroxide; and
water; and
polymerizing the dicyclopentadiene by ring-opening metathesis polymerization to form a porous polymer embedded with the zirconium hydroxide particles.

8. The method of claim 7, further comprising:
exposing the polymer to oxygen to form hydroperoxide groups on the polymer.

* * * * *